United States Patent Office 3,214,252
Patented Oct. 26, 1965

3,214,252
FUEL GEL COMPOSITIONS
William Hubert Lehmacher, Darien, Conn., assignor to Colgate Palmolive Company, New York, N.Y., a corporation of Delaware
No Drawing. Filed Apr. 2, 1962, Ser. No. 184,555
12 Claims. (Cl. 44—7)

This invention relates to new compositions of matter. More particularly, the invention relates to stable alcohol gel compositions.

Although gel compositions have been employed in making a wide variety of products such as solidified fuels, cosmetic preparations, hair conditioners and the like, many of the known gelling agents have seriously disadvantageous characteristics. For example, some alcohol gels do not have the desired gel thicknesses or viscosities and require rather large amounts of gelling agent to thicken the alcohol to a useful extent and to make a stable gel. Furthermore, in some fuel gels, the properties of combustion are not satisfactory. Accordingly, there exists a need for improved alcohol gel compositions, such as those of the present invention, wherein a small proportion of gelling agent can be employed to form a stable composition of desired viscosity. In the interest of simplicity, the invention will be explained as it is particularly adaptable to the field of alcohol fuel gels. It is to be understood, however, that the gel composition of the invention can be employed in varying other applications, too.

In accordance with the present invention, a stable alcohol gel comprises at least one alcohol and a hydrolyzed olefin-maleic anhydride copolymer.

Alcohols which can be employed in preparing the new compositions of the present invention include monohydroxy alcohols which exhibit the required properties of combustibility and form good gels with the olefin-maleic anhydride copolymer. Accordingly the term "alcohol" as employed herein and in the appended claims is to be understood to include any monohydroxy alcohol which forms a stable gel of desired viscosity with the copolymer mentioned above, which gel burns with heat of acceptable intensity and leaves little residue after burning. Such compounds include methyl alcohol, ethyl alcohol, propyl alcohol, isopropyl alcohol, butyl alcohol, isobutyl alcohol, pentanol, hexanol, heptanol, octanol, nonanol, decanol, dodecanol and the like. It is preferred, however, to employ the lower molecular weight monohydroxy alcohols containing from 1 to 6 carbon atoms, when fuel gels having good characteristics of combustibility with substantially smokeless, soot-free burning are desired. On the other hand, where prevention of smoke and soot are not of prime importance, the higher molecular weight monohydroxy alcohols can be utilized so long as they have the desired characteristics of combustibility to suit the particular use and form a stable gel with the copolymeric gelling agent defined hereinbelow. Although the alcohols used are generally anhydrous, they can be diluted to a rather large degree with a diluent such as water. When a dilute alcohol is used, it should not contain so much diluent that it interferes with combustion. Generally, it is preferred that alcohols utilized in preparing the new fuel gel composition of this invention be at least about 80 precent concentration when they contain a diluent such as water. However, water in concentrations as great as 40 percent can be present in the compositions depending upon the particular end use in which the gel is to be employed.

Although excellent fuel gel compositions are made by using a single alcohol, a mixture of two or more alcohols can be utilized. When such is the case, the mixture of alcohols can be in any proportions desirable, so long as the total alcoholic content is sufficient to provide acceptable properties of combustibility. An excellent gel can be prepared which burns with a substantially smokeless and soot-free flame when a mixture of ethyl and methyl alcohols is used and the methyl alcohol is present in an amount of about 40 percent by weight, based on the total weight of the composition.

Other combustible fuels, for example hydrocarbons, such as benzol, gasoline and mineral spirits can also be employed in mixtures with the alcohols in preparing the new compositions of the invention. However, since these types of compounds are usually non-polar in nature and tend to separate from the remainder of the composition, they are generally utilized in relatively small amounts, preferably about up to 10.0 percent by weight of the composition although such limitation is not critical and greater amounts of the non-polar compound can be present so long as the stability and combustibility of the final composition is not adversely affected.

The olefin-maleic anhydride copolymers utilized as gelling agents in the practice of the invention vary widely in composition. Essentially they are the linear and cross-linked resinous copolymers of maleic anhydride with an olefin containing from 2 to 4 carbon atoms, e.g., ethylene, propylene, butylene and isobutylene. Under the usual preliminary conditions for the formation of the copolymers, the olefin and maleic anhydride may be combined in substantially equimolar proportions. These copolymers can vary widely in viscosity, those having viscosities of from about 10,000 to 200,000 centipoises being best for use in the new compositions of this invention. The viscosities are measured at 25° C. on a 1.0 percent aqueous solution at pH 9 using a Brookfield viscometer, No. 6 spindle at 25 revolutions per minute. Although both linear and cross-linked olefin-maleic anhydride copolymers are useful in preparing the new compositions of this invention, the cross-linked copolymers are preferred. Many cross-linking agents are suitable to form such copolymers. One of the preferred cross-linking agents is vinyl crotonate; but other known difunctional vinyl type cross-linking agents also can be utilized. These cross-linking agents are employed during the polymerization of the olefin and maleic anhydride. Other difunctional compounds, such as glycols and diamines, can also be used as cross-linking agents. However, these types of cross-linkers are utilized after polymerization has taken place. The copolymers may be manufactured by any of the usual vinyl polymerization processes known in the art.

In order to form a gel with the combustible compound, the copolymer is employed in hydrolyzed form in the composition. Any suitable hydrolyzing agent can be employed for this purpose. Among such agents are water; basic compounds, such as sodium, potassium and ammonium hydroxides; inorganic and organic acids, such as sulfuric acid, hydrochloric acid, acetic acid and the like; and other inorganic and organic compounds which are capable of supplying a hydroxyl group. Water, however, being the cheapest and most readily available compound is the preferred hydrolyzing agent utilized in preparation of the new fuel gels of this invention. Hydrolysis of the copolymer can take place before mixing it with combustible compound or other materials or it can take place in situ in the gel composition itself as the constituents thereof are being mixed together to form the gel.

Although the fuel gels prepared in accordance with the invention which contain the combustible compounds and the hydrolyzed copolymer alone exhibit a good degree of stability and firmness, alkaline agents can be added to the composition if it is preferred to obtain a fuel gel composition which exhibits a substantially higher viscosity at the same concentration of the copolymer. Alkaline agents are accordingly employed to neutralize the copolymer and to adjust the pH of the alcohol-copolymer mixture. Generally, any alkaline agent, such as inorganic and organic nitrogen-containing compounds and the like can be employed for this purpose. The inorganic agents include ammonium hydroxide, ammonia, sodium hydroxide, potassium hydroxide and other hydroxides and inorganic compounds which act as neutralizing agents. The organic agents include alkyl amines, alkanolamines and diamines, with those containing from 1 to 7 carbon atoms in the hydrocarbon groups performing well in the practice of the invention, whether they be primary, secondary or tertiary compounds. Examples of these compounds include ethanolamines, propanolamines, hexamethylene diamine and the like. It is preferred, however, to employ the low molecular weight alkyl amines such as the mono-, di- and tri-ethyl and methyl amines.

The alcohols, copolymers and alkaline agents, where they are employed, are utilized in widely varying amounts in the compositions in this invention. In general, the new fuel gels of the invention comprise a major proportion of the alcohol and a minor proportion of the hydrolyzed copolymer sufficient to form a stable gel with the alcohol. The alcohol can be used in amounts of as little as 60 percent or less to as much as 95 percent or more, by weight, based on the total weight of the composition. Preferably, however, the alcohol is employed in an amount of about 70 to 80 percent. The copolymer is employed in an amount in a range of as little as about 0.1 percent to as much as about 10 percent or more, by weight, based on the total weight of the composition. In those compositions in which an alkaline agent is employed, the specific amount of alkaline agent can vary widely. If total and complete neutralization of the copolymer is desired, the alkaline agent is employed in an amount sufficient to neutralize the copolymer substantially completely and to adjust the pH of the alcohol copolymer mixture to about 8.5 to 9. On the other hand, enough alkaline agent, sufficient to adjust the pH to at least about 6, will develop a firm gel composition although it is to be understood that compositions containing no alkaline agent will develop a firm gel when the required amount of hydrolyzed copolymer is present. However, compositions having a pH of about 8.5 to 9 exhibit the best properties of combustibility, stability and the like when the minimum amount of copolymer is utilized. When a neutralizing agent is employed, the amount is generally in a range of about 0.01 percent up to about 5.0 percent by weight, based on the total weight of the composition, depending upon the type and concentration of the particular neutralizing agent being used.

Water can also be included in the compositions of this invention in an amount of up to about 40 percent by weight thereof. Accordingly, as mentioned hereinabove, water can be present as a diluent for the alcohols as well as a hydrolyzing agent for the copolymer. It also conveniently acts as a vehicle for introducing the copolymer into the alcohol solution. Although amounts of water in excess of 40 percent by weight can be present in the composition, this may be undesirable since the combustible properties thereof may be adversely affected at least to a degree.

The new compositions disclosed and claimed herein can be prepared in a relatively simple manner. The copolymer is dispersed in water and preferably heated to a temperature between about 20° C. and boiling point of the water-copolymer mixture until a uniformly thick paste results. Although heating is not necessary, it permits hydrolysis of the polymer in a minimum amount of time. Subsequently, this paste is stirred into the required amount of alcohol at a temperature between about 20° C. and the boiling point of the mixture and agitated until a substantially homogeneous gel is obtained. On the other hand, the gels can also be prepared by mixing the alcohol, hydrolyzing agent and the copolymer in its dry form as a powder and agitating the mixture at an elevated temperature, if necessary, until the gel is formed. Regardless of the particular sequence of steps employed in preparing the gels, the mixture at this stage usually has a pH of about 2 to 4. Therefore, if an alkaline agent is to be utilized, it is generally added to the mixture at this point until the pH reaches at least about 6, and preferably about 8.5 to 9, so that an especially firm gel develops but in which a minimum amount of copolymer is utilized. It is to be noted, however, that it is also possible to add the alkaline agent directly to the hydrolyzed copolymer before it is mixed with the alcohol.

In order to illustrate the present invention more fully, the following specific examples are set forth. In the examples, all parts and percents are by weight except where otherwise stated.

*Example I*

To 96 cc. of water there were added 4 grams of a copolymer of ethylene and maleic anhydride cross-linked with a minor proportion of vinyl crotonate and having a viscosity of 160,000 centipoises determined as previously described in this specification. The mixture was heated to 90° C. with agitation for about a half hour until a thick paste formed. Subsequently 40 grams of the paste were added to 180 cc. of anhydrous ethyl alcohol. The alcohol-copolymer mixture was then agitated at room temperature until the paste was substantially homogeneously dispersed in the alcohol. The initial pH of the mixture was 3.7. Triethyl amine was then added to the mixture dropwise until a pH of about 9 was reached. At this point, a firm stable, extrudable alcohol gel developed. The gel was ignited and burned readily with little sputtering. Furthermore, the gel kept its shape throughout the period of combustion and the flame was almost colorless and soot-free.

*Example II*

To 99 cc. of water there was added 1 gram of a vinyl crotonate cross-linked copolymer of ethylene and maleic anhydride having a viscosity of about 160,000 centipoises. The mixture was heated to about 90° C. with agitation until a thick paste was formed. Three drops of triethylamine were then added to the paste and a clear, stiff, substantially non-thixotropic gel was formed. Subsequently, 10 cc. of ethyl alcohol were added to 20 grams of the gel. The resulting composition was a gel which flowed rather easily. The addition of another 10 cc. of alcohol was effected and the composition still remained in a gelled state but was easy flowing. Upon the addition of another 10 cc. of alcohol the substance remained in a gelled state and retained its properties of flowability. Thereafter, an additional 30 cc. of alcohol were added to the composition. The gel became very fluid at this point and the pH of the composition was 6.9. Thereupon 70 drops of triethylamine were added to the composition and the pH was raised to 8.2. The resulting composition, although still a fluid gel, exhibited less fluidity. The pH of the composition was raised to 8.3 by 30 additional drops of triethylamine. The composition was still a fluid gel. The fuel gel composition so prepared was extrudable, had excellent properties of combustibility and burned readily with little sputtering with a soot-free and almost colorless flame. Moreover, the gel kept its shape throughout the period of combustion.

*Example III*

To 97.5 cc. of water there were added 2.5 grams of a vinyl crotonate cross-linked copolymer of ethylene and maleic anhydride having a viscosity of 160,000 centipoises. The mixture was heated to about 90° C. with agitation until a thick paste was formed. Approximately 20 minutes heating time was necessary to disperse the copolymer in water. 40 grams of the paste so formed were added to 180 cc. of ethyl alcohol at room temperature (ca. 20° C.) and the mixture was stirred to form a homogeneous composition. The pH of the mixture was 4. Diethylamine was added dropwise to the composition and at pH 6 a clear slightly fluid gel was obtained. The addition of diethyl-amine was continued until the pH was raised to 8.7. At this point the gel remained slightly fluid and clear. The gel so formed was extrudable and when ignited burned readily with little sputtering. Moreover, the gel kept its shape throughout the period of combustion and burned with a flame that was essentially free of soot and almost colorless.

*Example IV*

To 5 grams of the copolymeric paste prepared in accordance with the procedure of Example III, there were added 23 cc. of ethyl alcohol. The resulting composition was a gel which flowed rather easily. Concentrated ammonia was then added dropwise to the composition and after a few drops the pH was raised to about 9 whereupon the gel became fairly thick but extrudable in the manner similar to that formed in Example III. When the gel was ignited it burned readily with little sputtering, keeping its shape throughout the period of combustion and burning with an essentially soot-free and almost colorless flame.

In a like composition where 12 drops of concentrated ammonia were added to the gel and the pH was raised to a point substantially above 9, the gel became fluid and although capable of burning, did not hold its shape and could not be extruded from a tube.

*Example V*

To 96 cc. of water there were added 4 grams of a vinyl crotonate cross-linked copolymer of ethylene and maleic anhydride having a viscosity of 160,000 centipoises. The mixture was heated to 90° C. with agitation for about a half hour until a thick paste was formed. Subsequently, 40 grams of the paste were added to 180 cc. of ethyl alcohol and the mixture was agitated at room temperature, about 20° C., until the paste was substantially homogeneously dispersed in the alcohol. Diethylamine was then added dropwise until the composition had a pH of 9. After 45 minutes, the color was a light pink and the pH dropped to 7. Additional diethylamine was then added to raise the pH to 9 again. After standing overnight a clear, fairly stiff, substantially extrudable gel is formed. The gel was ignited and burned readily with little sputtering, keeping its shape throughout the period of combustion and produce and essentially soot-free and an almost colorless flame.

*Example VI*

To 20 grams of a vinyl crotinate cross-linked copolymer of ethylene and maleic anhydride in the form of a powder having a viscosity of 160,000 centipoises determined as set out hereinabove, there were added 180 cc. of ethyl alcohol. The mixture was a milky slurry having a pH of 3.4. Subsequently, 10 drops of trimethylamine were added to the slurry and the pH was raised to 6.7. Continued addition of trimethylamine brought about varying pH values due to hydrolysis and a pink color was obtained after the addition of 100 drops. Further addition of trimethylamine produced a thick gel when 570 drops of the amine had been added. The pH was about 6.6 at this stage in the preparation. The gel so formed was extrudable, stable and burned readily with little sputtering, keeping its shape throughout the period of combustion and produced a substantially soot-free and colorless flame.

*Example VII*

200 additional cc. of ethyl alcohol were added to a gel composition prepared in accordance with the preceding example. The pH of the gel was 6.3. Next 130 drops of trimethylamine were added to the gel and the pH was raised to 6.5. The resulting gel was a thick white cream that had properties of combustibility similar to the composition in the foregoing example.

*Example VIII*

An additional 100 cc. of ethyl alcohol and an additional 180 drops of triethylamine were added to the gel composition prepared according to the procedure of Example VII. A very thick gel was attained. The pH of the composition was 6.6. Although the gel was somewhat too heavy for convenient extrusion from a tube, it still retained the ability to be extruded. The gel had properties of combustibility similar to that in Examples VI and VII.

*Example IX*

An additional 100 cc. of ethyl alcohol were added to the composition of Example VIII and it was permitted to stand overnight. The pH of the resulting gel was 6.6. It exhibited properties similar to the composition prepared in accordance with the procedure of Example VII.

*Example X*

To 100 grams of water there were added 7.2 grams of a vinyl crotonate cross-linked copolymer of ethylene and maleic anhydride having a viscosity of about 160,000 centipoises. The mixture was heated to about 90° C. with agitation until a thick paste was formed. 54.0 grams of the copolymeric paste were mixed with 146.0 grams of secondary butanol. The mixture was agitated at room temperature (about 20° C.) until a homogeneous gel was obtained. Subsequently 12 grams of triethylamine were added to the mixture. At this point an additional 3.0 grams of the copolymer mentioned hereinabove were added to the gel in a form of a dry powder and finally 80.0 grams of anhydrous ethyl alcohol were added to the gel. The composition had a pH of about 9, exhibited excellent properties of combustibility and extrudability and burned readily with little sputtering and without loss of shape.

*Example XI*

54.0 grams of the copolymeric paste employed in Example X were mixed with 146.0 grams of secondary butanol. The mixture was agitated at room temperature (about 20° C.) until a homogeneous uniform gel was obtained. Next 12.0 grams of triethylamine were added to the gel followed by 3.0 grams of the copolymer in the form of a dry powder. Finally 130.0 grams of anhydrous ethyl alcohol and 50.0 grams of anhydrous methyl alcohol were added to the gel composition with agitation until a homogeneous composition was obtained. The gel so formed had a pH of about 9, exhibited excellent properties of combustibility and extrudability and burned readily with little sputtering, essentially no loss of shape and produced a substantially soot-free almost colorless flame.

*Example XII*

To 200.0 grams of anhydrous methyl alcohol there were added 5.0 grams of a vinyl crotonate cross-linked copolymer of ethylene and maleic anhydride having a viscosity of about 160,000 centipoises. The addition of the constituents was made at room temperature (about 20° C.). The copolymer was added directly to the alcohol in the form of a dry powder. Next 20.0 grams of water were added to the copolymer alcohol mixture and the copolymer readily hydrolyzed to form a clear fluid gel with the methyl alcohol. Subsequently, 10.0 grams of triethylamine were added to the composition and the pH adjusted to about 9. The fuel gel composition so prepared was extrudable, had excellent properties of combustibility and burned readily without loss of shape and little sputtering. The flame produced was substantially soot-free and colorless.

*Example XIII*

The procedure of Example XII was repeated with the exception that isopropyl alcohol was employed instead of methyl alcohol and the amount of water was increased to 40 grams. The gel so formed had properties similar to that in Example XII.

*Example XIV*

The procedure of Example XII was again repeated with the constituents listed below in their order of addition.

200 grams secondary butanol
12 grams ethylene-maleic anhydride copolymer
66 grams water
20 grams triethylamine
40 grams of absolute methyl alcohol The composition so formed exhibited properties similar to that of Examples XII and XIII.

*Example XV*

The procedure of Example XIV was repeated with similar results except that the absolute methyl alcohol was omitted from the composition.

*Example XVI*

To 85.0 grams of anhydrous ethyl alcohol there were added with stirring 4.25 grams of a vinyl crotonate cross-linked copolymer of ethylene and maleic anhydride having a viscosity of about 160,000 centipoises. Subsequently, 10.75 grams of water were added to the mixture with agitation and a firm, extrudable gel was formed. The gel burned readily without loss of shape and little sputtering. The flame was substantially soot-free and colorless.

*Example XVII*

To 100.0 grams of water there were added 6.7 grams of a vinyl crotonate cross-linked copolymer of ethylene and maleic anhydride having a viscosity of about 160,000 centipoises. The mixture was heated to about 90° C. until a thick paste was formed. 13.0 grams of the copolymeric paste were mixed with 35.2 grams of secondary butanol. The mixture was agitated at room temperature (about 20° C.) until a homogeneous gel was obtained. Subsequently 2.9 grams of triethylamine were added to the mixture. At this point, 0.74 gram of the copolymer was added to the gel in the form of a dry powder and finally 12.0 grams of methyl alcohol and 4.76 grams of mineral spirits were separately added to the gel with agitation until a homogeneous composition was obtained. The composition exhibited excellent properties of combustibility and extrudability. It burned without sputtering and loss of shape.

Various conventional additives for alcohol gels, such as dyes, denaturants, perfumes and the like may be used with the compositions of this invention depending upon the particular end use of the gel.

Although the invention has been described in accordance with certain specific embodiments thereof, it is to be understood that numerous modifications and variations of the embodiments disclosed herein may be made without departing from the spirit and scope thereof.

What is claimed is:

1. An alcohol fuel gel composition comprising a major proportion of aliphatic monohydroxy alcohol and a minor proportion, sufficient to form a stable gel with said alcohol, of hydrolyzed copolymer of a low molecular weight olefin and maleic anhydride.

2. An alcohol fuel gel composition comprising a major proportion of aliphatic monohydroxy alcohol and a minor proportion, sufficient to form a stable gel with said alcohol, of hydrolyzed copolymer of a low molecular weight olefin and maleic anhydride, said copolymer being at least partially neutralized with an alkaline neutralizing compound in an amount sufficient to adjust the pH of the composition to about 6 to 9.

3. A stable alcohol fuel gel composition comprising by weight, based on the total weight of the composition, about 60 to 95 percent of aliphatic monohydroxy alcohol, 0.1 to 10.0 percent of hydrolyzed copolymer of a low molecular weight olefin and maleic anhydride, said copolymer being at least partially neutralized with an alkaline agent in an amount sufficient to adjust the pH of the composition to about 6 to 9, and up to about 40% water, said percent of water being in excess of that amount sufficient to hydrolyze said copolymer.

4. A stable alcohol fuel gel composition as defined in claim 3 in which the alcohol is selected from the group consisting of methyl and ethyl alcohols and mixtures thereof.

5. A stable alcohol fuel gel composition comprising by weight, based on the total weight of the composition, about 60 to 95 percent of low molecular weight aliphatic monohydroxy alcohol containing from 1 to 6 carbon atoms, 0.1 to 10.0 percent of hydrolyzed copolymer of a low molecular weight olefin and maleic anhydride, said copolymer being at least partially neutralized with an alkaline agent in an amount sufficient to adjust the pH of the composition to about 6 to 9, and up to about 40% water, said percent of water being in excess of that amount sufficient to hydrolyze said copolymer.

6. A stable alcoholic fuel gel composition comprising by weight, based on the total weight of the composition, about 60 to 95 percent of low molecular weight aliphatic monohydroxy alcohol containing from 1 to 6 carbon atoms, 0.1 to 10.0 percent of hydrolyzed cross-linked copolymer of a low molecular weight olefin and maleic anhydride, said copolymer being at least partially neutralized with an alkaline agent in an amount sufficient to adjust the pH of the composition to about 6 to 9, and up to about 40% water, said percent of water being in excess of that amount sufficient to hydrolyze said copolymer.

7. A fuel gel composition as defined in claim 6 wherein the hydrolyzed copolymer of a low molecular weight olefin and maleic anhydride is cross-linked with vinyl crotonate.

8. A stable alcohol fuel gel composition comprising by weight, based on the total weight of the composition about 60 to 95 percent of at least one low molecular weight alphatic monohydroxy alcohol containing from 1 to 6 carbon atoms, 0.1 to 10.0 percent of a hydrolyzed copolymer of a low molecular weight olefin and maleic anhydride, said copolymer being at least partially neutralized with about 0.01 to 5.0 percent of an alkaline agent to adjust the pH of the composition, and up to about 40% water, said percent of water being in excess of that amount sufficient to hydrolyze said copolymer, said composition, after adjustment, having a pH of about 6 to 9.

9. A stable alcohol fuel gel composition comprising by weight, based on the total weight of the composition about 60 to 95 percent of a low molecular weight aliphatic monohydroxy alcohol containing from 1 to 6 carbon atoms, 0.1 to 10.0 percent of a hydrolyzed cross-linked copolymer of a low molecular weight olefin containing from 2 to 4 carbon atoms and maleic anhydride, said copolymer being at least partially neutralized with about 0.01 to 5.0 percent of an amine selected from the group consisting of mono-, di- and tri-alkyl amines containing from 1 to 2 carbon atoms in the alkyl group to adjust the pH of the composition to about 6 to 9, and up to about 40% water, said percent of water being in excess of that amount sufficient to hydrolyze said copolymer.

10. A stable alcohol fuel gel composition comprising by weight, based on the total weight of the composition, about 60 to 95 percent of aliphatic monohydroxy alcohol, 0.1 to 10.0 percent of hydrolyzed copolymer of a low molecular weight olefin and maleic anhydride, said copolymer being substantially completely neutralized with about 0.01 to 5.0 percent of an alkaline agent to adjust the pH of the composition to about 8.5 to 9, and up to about 40% water, said percent of water being in excess of that amount sufficient to hydrolyze said copolymer.

11. A stable alcohol fuel gel composition comprising by weight, based on the total weight of the composition, about 70 to 80 percent of aliphatic monohydroxy alcohol, 0.01 to 10.0 percent of hydrolyzed copolymer of a low molecular weight olefin and maleic anhydride cross-linked with vinyl crotonate, said copolymer being substantially completely neutralized with about 0.01 to 5.0 percent of an alkaline agent to adjust the pH of the composition to about 8.5 to 9, and up to about 40% water, said percent of water being in excess of that amount sufficient to hydrolyze said copolymer.

12. A stable alcohol fuel gel composition comprising by weight, based on the total weight of the composition, about 60 to 95 percent of at least one low molecular weight aliphatic monohydroxy alcohol containing from 1 to 6 carbon atoms, 0.1 to 10.0 percent of a hydrolyzed copolymer of a low molecular weight olefin containing from 2 to 4 carbon atoms and maleic anhydride, said copolymer being at least partially neutralized with about 0.01 to 5.0 percent of an amine selected from the group consisting of mono-, di- and tri-alkyl amines containing 1 to 2 carbon atoms in the alkyl group to adjust the pH of the composition, a small amount up to about 10.0 percent, of combustible non-polar hydrocarbon fuel, and up to about 40% water, said percent of water being in excess of that amount sufficient to hydrolyze said copolymer, said composition, after adjustment, having a pH of about 6 to 9.

References Cited by the Examiner
UNITED STATES PATENTS

| | | | |
|---|---|---|---|
| 2,207,894 | 7/40 | Onderdonk | 44—7.3 |
| 2,289,222 | 7/42 | Spanagel | 23—75 X |
| 2,378,629 | 6/45 | Hanford | 260—78.5 |
| 2,613,142 | 10/52 | Wiczer | 44—7.3 |
| 2,977,334 | 3/61 | Zopf et al. | 252—56 X |

DANIEL E. WYMAN, *Primary Examiner.*